United States Patent [19]
Lietaert, Jr.

[11] 3,881,680
[45] May 6, 1975

[54] CYCLE LOCKING SYSTEM

[76] Inventor: Robert J. Lietaert, Jr., 27545 Wyly Dr., Mount Clemens, Mich. 48043

[22] Filed: Apr. 5, 1974

[21] Appl. No.: 458,310

[52] U.S. Cl. .................. 248/499; 70/234; 211/5
[51] Int. Cl. ............................................. E05b 71/00
[58] Field of Search .................. 70/58, 234; 211/5; 105/368 R, 368 T; 248/119 R, 203, 346, 361 A, 499; 280/179 A

[56] References Cited
UNITED STATES PATENTS

| | | | |
|---|---|---|---|
| 581,288 | 4/1897 | Kenyon | 280/179 A |
| 698,277 | 4/1902 | Hammond | 211/5 |
| 1,255,384 | 2/1918 | Cadman | 280/415 |
| 1,769,277 | 7/1930 | Snyder et al. | 248/119 R |
| 2,545,320 | 3/1951 | Tilson et al. | 248/346 |
| 3,739,609 | 6/1973 | Kaufman | 70/234 |

Primary Examiner—Albert G. Craig, Jr.
Attorney, Agent, or Firm—William L. Fisher, Esq.

[57] ABSTRACT

Improvement in a cycle locking system for locking a cycle having a cycle locking device having a base member in the form of a doubly opened ended wheel cradle having opposite upstanding side walls and means for fastening said cradle to concrete or the like, the device having a cycle-fastening chain made fast to one of said side walls, said iprovement comprising eyelet means on the other of said side walls, said eyelet means having a diameter greater than that of the chain so that the latter can thread through the cycle and then through the eyelet means from inside to outside thereof and extend beyond the eyelet means so that the free end thereof is capable of serving as an anchoring means for locking thereto a second cycle-fastening chain, whereby to lock said cycle to said locking device.

6 Claims, 7 Drawing Figures

PATENTED MAY 6 1975

3,881,680

CYCLE LOCKING SYSTEM

My invention relates to locking systems for locking against theft valuable cycles, such as present day two wheeled motorcycles, the purchase of any of which requires a substantial investment on the part of the owner thereof.

The principal object of my invention is to provide improvements in cycle locking systems for such cycles, whereby to best secure the same against theft.

The foregoing object of my invention and the advantages thereof will become apparent during the course of the following description, taken in conjunction with the accompanying drawings, in which.

Figure 6:
FIGS. 6 and 7 are, respectively, enlarged top plan and vertical sectional views of a portion of the structure of FIG. 5.
Figure 7:
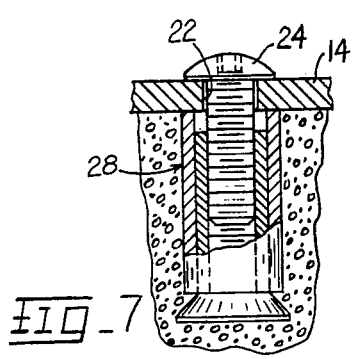
Figure 5:
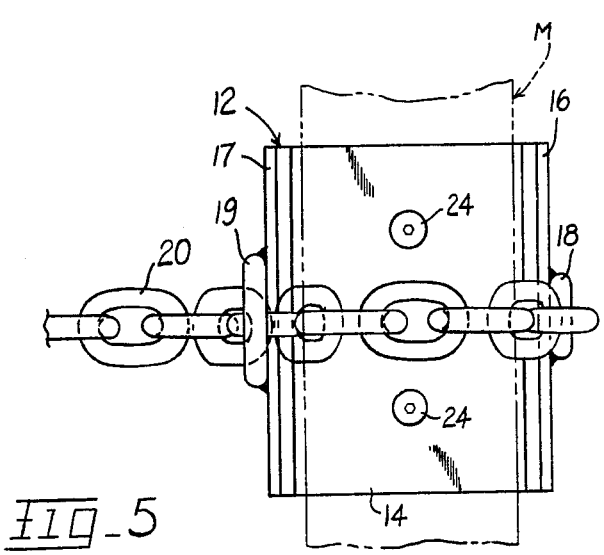

Referring to the drawings in greater detail, 10 generally designates my improved locking device which is a part of said embodiment. Said locking device 10 comprises a base member 12 in the form of a doubly open ended wheel cradle having a bottom wall 14 and transversely spaced apart opposite side walls 16 and 17 which upstand from said bottom wall 14 at right angles thereto. Eyelets 18 and 19 (18 can be made identical to 19) are made fast to said side walls 16 and 17, respectively, so that one 18 thereof serves as a permanent anchor for a wheel fastening chain 20 while the other one 19 serves as a threading eye through which the free end of said chain 20 is capable of passing for locking a cycle, such as shown in phantom lines and indicated at M in FIG. 1. Said bottom wall 14 is provided with axially spaced apart transversely central apertures 22 which cooperate with fastening bolts 24 for anchoring the device 10 to the ground, preferably via concrete 26, as shown in FIGS. 6 and 7, in which are embedded concrete anchors 28 having internal threads for threadably engaging the shanks of said bolts 24. The heads of said bolts 24 are each provided with a centrally located depressed wrench socket, preferably for an Allen type wrench. Each head is frustrospherical in shape so that it can not be wrenched from a side of said head but only from thereabove.

Figure 1:
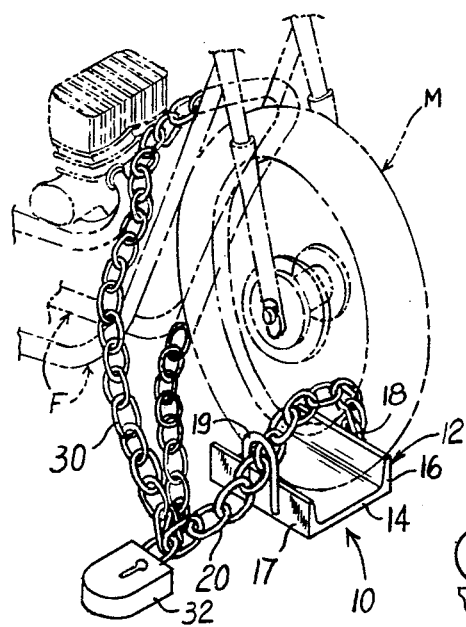
FIG. 1 is a perspective view of an improved cycle locking system embodying my invention.
Figure 2:
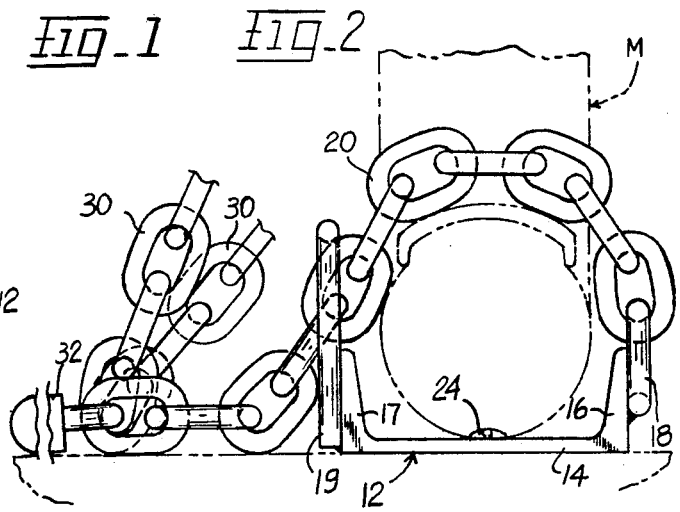
FIGS. 2–5 are, respectively, front and opposite side elevational and top plan views of said embodiment.
Figure 3:
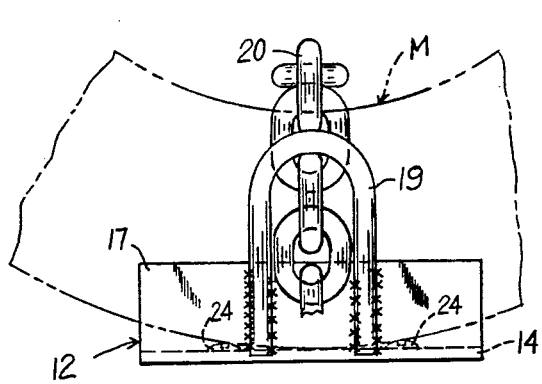
Figure 4:
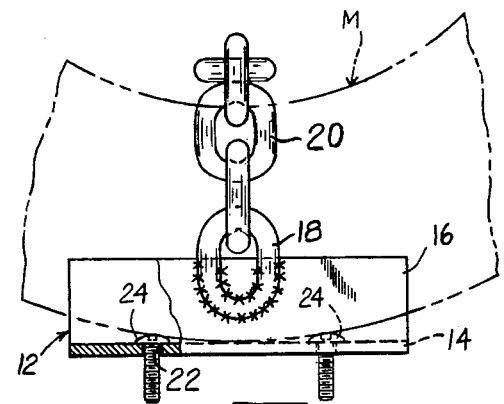

In use of said device 10, the base member 12 is first anchored to concrete via the bolts 24 and anchors 28, as described, and the wrench sockets of the bolts 24 are preferably mutilated so that the base member 12 is substantially permanently affixed to the concrete. Thereafter, the chain 20 is threaded through the spokes of the front wheel, preferably, of the cycle M and then through the eyelet 19 from the inside to the outside thereof. A second chain 30 is then employed for locking the frame F of said cycle M by wrapping said chain 30 around principal members of said frame F as shown in FIG. 1. The two free ends of said chain 30 are then locked, together with the free end of the chain 20, by the shackle of a padlock 32 which passes through three chain links at one time.

Subsequent to fabrication and assembly, the eyelets 18 and 19 and the chains 20 and 30 are case hardened to resist breakage by thieves. The eyelets 18 and 19 are preferably welded, as shown, to the side walls 16 and 17, respectively. As previously mentioned, eyelet 18 can be made identical to eyelet 19 in which case the eyelet 18 would first be threaded through the last link of the captured end of the chain 20 prior to welding of said eyelet 18 to the side wall 16.

It will thus be seen that there has been provided by my invention improvements in cycle locking systems in which the object hereinabove set forth, together with many thoroughly practical advantages, has been successfully achieved. While a preferred embodiment of my invention has been shown and described, it is to be understood that variations and changes may be resorted to without departing from the spirit of my invention as defined by the appended claims. Throughout the specification and claims the phrase "made fast to one of said side walls" is used in reference to the holding of the captured end of the chain 20 in respect to the side wall 16. It should be noted, however, in respect to this phrase that the captured end of the chain 20 is freely moveable on or about the eyelet 18.

What I claim is:

1. Improvement in a cycle locking system for locking a cycle having a cycle locking device having a base member in the form of a doubly opened ended wheel cradle having opposite upstanding side walls and means for fastening said cradle to concrete or the like, said device having a cycle-fastening chain made fast to one of said side walls, said improvement comprising eyelet means on the other of said side walls, said eyelet means and said cycle-fastening chain being so related that the diameter of said eyelet means is greater than that of said chain so that the latter can thread through said cycle and then through said eyelet means from inside to outside thereof and extend beyond said eyelet means so that the said free end thereof is capable of serving as an anchoring means for locking thereto a second cycle-fastening chain, whereby to lock said cycle to said locking device.

2. Improvement as claimed in claim 1, fastening bolts for said base member, each having a head so constructed that it cannot be wrenched from a side of said head but only from thereabove.

3. Improvement as claimed in claim 1, a second chain for wrapping around the frame of said cycle and means for locking the free ends of said second chain with the free end of the first chain, whereby to lock said cycle wheel and frame to said cycle locking device.

4. Improvement in a cycle locking system for locking a cycle having a method of locking consisting of anchoring a base member of a cycle locking device in concrete and passing a cycle-fastening chain made fast to said base member through said cycle and anchoring the free end of said chain to said base member, said improvement comprising making fast to said base member eyelet means so related to said chain that the diameter of said eyelet means is greater than that of said chain so that the latter can thread through said cycle and then through said eyelet means from inside to outside thereof and extend beyond said eyelet means so that the said free end thereof is capable of serving as an anchoring means for locking thereto a second cycle-fastening chain, whereby to lock said cycle to said locking device.

5. Improvement as claimed in claim 3, further comprising wrapping said second chain around the frame of said cycle and locking the free ends thereof with the free end of the first chain, whereby to lock both said cycle wheel and frame to said cycle locking device.

6. Improvement as claimed in claim 1, further comprising locking all three free ends together with the shackle of one lock passed through three links of the two chains at one time.

* * * * *